United States Patent Office 2,976,286
Patented Mar. 21, 1961

2,976,286
BASICALLY SUBSTITUTED PHENOTHIAZINE DERIVATIVES

Walter Schindler, Riehen, near Basel, and Charles Gansser, Basel, Switzerland, assignors to Geigy Chemical Corporation, Ardsley, N.Y., a corporation of Delaware No Drawing. Filed Aug. 28, 1959, Ser. No. 836,587

Claims priority, application Switzerland Sept. 10, 1958

7 Claims. (Cl. 260—243)

The present invention concerns new, basically substituted phenothiazine derivatives which have valuable pharmacological properties.

It has been found that N-substituted phenothiazine derivatives of the general formula

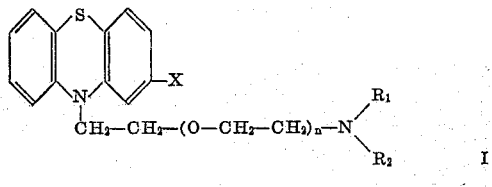

wherein:

X represents hydrogen or a chlorine atom,
$R_1$ and $R_2$ represent low molecular alkyl radicals, and
$n$ is a whole number from 1–2, have valuable pharmacological properties, in particular they can be used as antiallergics, anticonvulsives, sedatives or tranquilisers.

The new compounds are obtained by reacting, in the presence of an acid binding agent, phenothiazine of 3-chlorophenothiazine with a reactive ester of an amino alcohol of the general formula

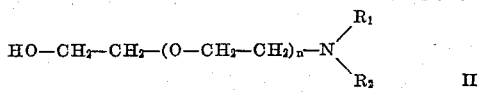

$R_1$, $R_2$ and $n$ having the meanings given above.

In particular sodium amide, sodium hydride, lithium amide, potassium amide as well as sodium, lithium and potassium themselves are suitable acid binding agents. The halides in particular are used as reactive esters of amino alcohols; individually can be named: dimethylaminoethoxyethyl chloride, dimethyl aminoethoxyethoxyethyl chloride (1 - dimethylamino - 8-chloro-3.6-dioxaoctane), diethylaminoethoxyethyl chloride, diethylaminoethoxyethoxyethyl chloride (1 - diethylamino - 8 - chloro-3.6-dioxa-octane), di-n-propylaminoethoxyethyl chloride, di-n-butylaminoethoxyethyl chloride as well as the corresponding bromides.

In addition, the new N-substituted phenothiazine derivatives of the general Formula I can also be produced by reacting phenothiazine or 3-chlorophenothiazine with phosgene, the reaction possibly being performed in the presence of an acid binding agent, reacting the 5-chlorocarbonyl compound obtained with an amino alcohol of the general Formula II and heating the 5-substituted phenothiazine derivative of the general formula

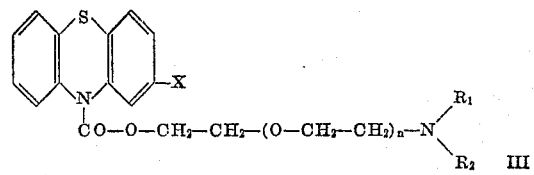

wherein X, $R_1$, $R_2$ and $n$ have the meanings given above, until carbon dioxide is split off.

Compounds of the general Formula I can be produced by a third process by reacting compounds of the general formula

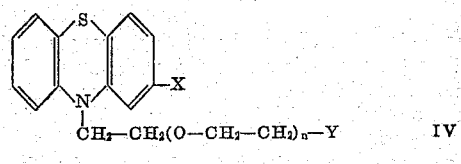

wherein:

Y represents a reactive esterified hydroxy group, for example the group —$OSO_3Na$, or a halogen atom, and X and N have the meanings given above, with a secondary amine of the general formula

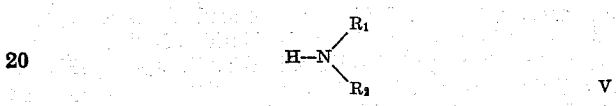

wherein $R_1$ and $R_2$ have the meanings given above, for example with dimethylamine, diethylamine, di-n-propyl-amine or di-n-butylamine. Starting materials of the general Formula IV are obtained in their turn, for example, by reacting halogen ethoxyethanols or halogen ethoxyethoxyethanols with phenothiazine or 3-chlorophenothiazine analogously to the first production process described, followed by esterification of the intermediate products containing hydroxyl obtained with strong inorganic or organic acids, for example with halogen hydracids such as hydrochloric acid or with sulphuric acid or organic sulphonic acids such as p-toluene sulphonic acid. As examples can be named 5-(β-chlorethoxyethyl)- and 5-(β-chlorethoxyethoxyethyl)- phenothiazine and -3-chlorophenothiazine which can be obtained, for example by treating the intermediate products containing hydroxyl with inorganic acid halides such as thionyl chloride or phosphorus oxychloride.

Finally, compounds of the general Formula I according to the invention are obtained by treating compounds of the general formula

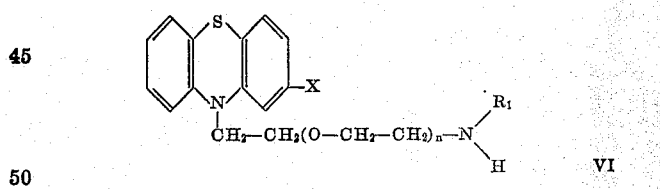

wherein:

$R_1$ represents a low molecular alkyl radical, and
X and $n$ have the meanings given above with a low molecular alkylating agent. For example, dimethyl sulphate, diethyl sulphate, methyl iodide, ethyl iodide, ethyl bromide, n-propyl bromide, n-butyl bromide and p-toluene sulphonic acid methyl ester are used as such agents in the presence of acid binding agents such as, e.g. sodium or potassium carbonate and an inert organic solvent, and in addition, e.g. formaldehyde in the presence of formic acid.

The tertiary bases form salts, some of which are water soluble, with compatible inorganic or organic acids such as hydrochloric acid, hydrobromic acid, sulphuric acid, phosphoric acid, methane sulphonic acid, ethane sulphonic acid, ethane disulphonic acid, acetic acid, succinic acid, fumaric acid, maleic acid, malic acid, tartaric acid, citric acid, benzoic acid and phthalic acid.

The following examples illustrate the production of the new compounds. Parts are given therein as parts by weight and their relationship to parts by volume is as that of grammes to cubic centimetres. The temperatures are in degrees centigrade.

*Example 1*

13.65 parts of phenothiazine are dissolved in 250 parts by volume of anhydrous benzene and the benzene solution of the base from 16.72 parts of dimethylaminoethoxyethyl chloride-hydrochloride in 150 parts by volume of anhydrous benzene is added.

A suspension of 3.35 parts of sodium amide in toluene is added dropwise while stirring strongly at 60–70° and then the whole is refluxed for 16 hours. Water is then added to the reaction mixture and the basic portions are removed from the benzene layer by shaking out three times with diluted hydrochloric acid. The combined extracts are made alkaline and extracted with ether. The ethereal solution is dried over potassium carbonate and concentrated. The residue is distilled in a high vacuum whereupon 5-(dimethylamino-ethoxyethyl)-phenothiazine passes over at 178° under 0.015 mm. pressure.

The hydrochloride prepared with alcoholic hydrochloric acid melts at 122–124° (from acetone-anhydrous ether).

On using the corresponding basic chlorides, 5-(dimethylaminoethoxyethoxyethyl)-phenothiazine, B.P.$_{0.0015}$ 183°, 5 - diethylaminoethoxyethyl) - phenothiazine, B.P.$_{0.008}$ 173.5°, the hydrochloride of which prepared with alcoholic hydrochloric acid melts at 133–135°, and 5-(diethylaminoethoxyethoxyethyl) - phenothiazine, B.P.$_{0.007}$ 202.5°, are obtained in an analogous manner.

*Example 2*

11.68 parts of 3-chlorophenothiazine are dissolved in 100 parts by volume of anhydrous benzene. A suspension of 2.37 parts of sodium amide in toluene is added dropwise while stirring strongly at 60–70° and the reaction mixture is refluxed for 1 hour.

The benzene solution of the base from 12.2 parts of dimethylaminoethoxyethyl chloride-hydrochloride in 100 parts by volume of benzene is then added dropwise while stirring strongly at 40° and the reaction mixture is kept for 3 hours at this temperature and then refluxed for 14 hours. Water is then added to the reaction mixture and the basic portions are removed from the benzene layer by shaking out three times with diluted hydrochloric acid. The combined extracts are made alkaline and extracted with ether and the ethereal solution is dried over potassium carbonate and concentrated. The residue is distilled in a high vacuum whereupon 5-(dimethylaminoethoxyethyl)-3-chlorophenothiazine passes over at 197–201° under 0.45 mm. pressure.

The hydrochloride prepared with alcoholic hydrochloric acid melts at 120–122° (from acetone-anhydrous ether).

On using the corresponding basic chloride, 5-(diethylamino-ethoxyethoxyethyl)-3-chlorophenothiazine is obtained in an analogous manner, B.P.$_{0.015}$ 193–197°.

The new compounds or compatible salts thereof can be used enterally or parenterally in admixture with a suitable pharmaceutical organic or inorganic, solid or liquid carrier.

What we claim is:

1. A member selected from the group consisting of compounds of the formula

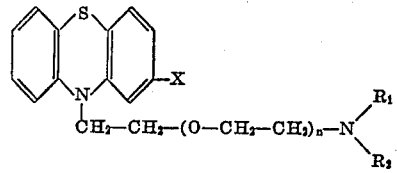

and the non-toxic acid addition salts thereof, wherein X is a member selected from the group consisting of hydrogen and chlorine, each of $R_1$ and $R_2$ is lower alkyl, and $n$ is an integer selected from the group consisting of 1 and 2.

2. 5-(dimethylaminoethoxyethyl)-phenothiazine.
3. 5-(dimethylaminoethoxyethoxyethyl)-phenothiazine.
4. 5-(diethylaminoethoxyethyl)-phenothiazine.
5. 5-(diethylaminoethoxyethoxyethyl)-phenothiazine.
6. 5 - (dimethylaminoethoxyethyl)-3-chlorophenothiazine.
7. 5-(diethylaminoethoxyethoxyethyl) - 3 - chlorophenothiazine.

References Cited in the file of this patent

FOREIGN PATENTS 1,195,211     France _____ May 19, 1959